(12) United States Patent
Boutet et al.

(10) Patent No.: US 7,504,648 B2
(45) Date of Patent: Mar. 17, 2009

(54) METHOD AND APPARATUS FOR DETERMINING FOCUS OF A SCANNING SYSTEM

(75) Inventors: John Claude Boutet, Rochester, NY (US); Christopher Myles Muir, Rochester (JP); Paul Stumpf, Springwater, NY (US)

(73) Assignee: Carestream Health, Inc., Rochester, NY (US)

( * ) Notice: Subject to any disclaimer, the term of this patent is extended or adjusted under 35 U.S.C. 154(b) by 24 days.

(21) Appl. No.: 11/741,246

(22) Filed: Apr. 27, 2007

(65) Prior Publication Data
US 2008/0265187 A1    Oct. 30, 2008

(51) Int. Cl.
G01B 26/00 (2006.01)
G01T 1/00 (2006.01)

(52) U.S. Cl. ............... 250/585; 250/237 G; 250/237 R; 250/581; 250/580

(58) Field of Classification Search .................. None
See application file for complete search history.

(56) References Cited

U.S. PATENT DOCUMENTS

| | | |
|---|---|---|
| 3,912,396 A | 10/1975 | Hartmann |
| 4,459,002 A | 7/1984 | Sakai et al. |
| 5,311,032 A | 5/1994 | Montoro et al. |
| 5,420,441 A | 5/1995 | Newman et al. |
| 5,591,968 A | 1/1997 | Grillet |
| 5,861,631 A | 1/1999 | Wendlandt et al. |
| 6,437,353 B1 | 8/2002 | Benner |

*Primary Examiner*—David P Porta
*Assistant Examiner*—Yara B Green

(57) ABSTRACT

A non-imaging tool for assisting in determining a focus in a scanning system that scans a planar object with a scanning beam in a fast scan direction, while the planar object is moved under the scanning beam in a slow scan direction perpendicular to the fast scan direction. The tool includes a plate having a planar surface; a focusing wedge mounted on the plate; and a ramped grating which forms part of the focusing wedge and which has a tilted surface which extends from above the plate surface to below the plate surface; the ramped grating including alternating parallel first stripes and second stripes, wherein the first and second stripes are one of, respectively, fluorescent and non-fluorescent stripes, storage phosphor and non-storage phosphor stripes, and reflective and non-reflective stripes.

15 Claims, 10 Drawing Sheets

⟶ SCAN ACROSS GRATINGS ⟶

SLOW-SCAN ACROSS RAMPED GRATINGS

METHOD AND APPARATUS FOR DETERMINING FOCUS OF A SCANNING SYSTEM

FIELD OF THE INVENTION

The invention relates generally to the field of radiography, and in particular to computed radiography. More specifically, the invention relates to a method and apparatus for determining when the scanning system of a computed radiography reader is at optimal focus.

BACKGROUND OF THE INVENTION

In computed radiography (CR), an imaging plate having a storage phosphor, is exposed to an x-ray image of an object, such as an anatomical structure of a patient, to record a latent x-ray image in the storage phosphor. The latent x-ray image is read out by stimulating the storage phosphor with stimulating radiation of a first wavelength range by a laser. Upon stimulation, the storage phosphor emits radiation at a second wavelength range in proportion to the quantity of x-rays received. The storage phosphor is scanned in a raster pattern by a laser beam deflected by an oscillating or rotating mirror. The emitted radiation is reflected by a mirror light collector and detected by one or more photodetectors to produce an electronic image signal. Typically, the storage phosphor is translated in a slow or page scan direction past the laser beam which is repeatedly scanned in a fast or line scan direction perpendicular to the page scan motion of the storage phosphor.

As the spot size of the scanning laser beam of a CR reader is reduced, the depth of field of the system is reduced and accurate focus becomes important. This is particularly true as CR systems go to 50 um or smaller laser beam spot sizes. If the CR reader is provided with means to shift the laser optics to storage phosphor distance to adjust focus, a means of determining when the system is at best focus is needed. Doing a focus series and measuring MTF (Modulation Transfer Function) at each position can determine the best focus but is laborious. An easy and low cost means to check and optimize focus is needed during assembly and field repairs or upgrades. To minimize cost, it is desirable to utilize the light collector, photodetectors, and digital electronics of the CR reader for measuring the signal from the focus measuring assembly. Since radiation collected to the photodetectors is normally filtered at the photodetector(s), to remove the scanning radiation, a means must be provided to detect the focus measuring radiation.

U.S. Pat. No. 5,420,441, issued May 30, 1995, inventors Newman et al., is directed to an automated method for analyzing the photometric calibration and image quality performance characteristics of a high resolution storage phosphor reader. A custom fabricated, lead mask test target is secured to a storage phosphor and exposed using a standard medical x-ray source. A storage phosphor reader, to be calibrated, reads the exposed storage phosphor to produce a digital x-ray image. The digital x-ray image is analyzed by means of a computer algorithm which presents analytic results in text and graphical form to isolate reader problems and to quantify calibration status of the reader.

U.S. Pat. No. 5,591,968, issued Jan. 7, 1997, inventor Grillet, discloses an image plate coated with a photostimulable element and a method of testing a digital device for scanning such plate with respect to various system parameters. A permanent and non-erasable test pattern is applied to the plate for subsequent scanning by the device.

U.S. Pat. No. 4,459,002, issued Jul. 10, 1984, inventors Sakai et al., discloses a focus detecting system which has a signal processing circuit for processing output signals from photoelectric transducer elements. The signal processing circuit has a circuit for obtaining an absolute value of the output signal and for producing power thereof.

U.S. Pat. No. 3,912,396, issued Oct. 14, 1975, inventor Hartmann, discloses an apparatus for measuring the modulation transfer function of an image-forming lens or lens system. The apparatus uses an object target which is of the type having parallel light lines on a dark background. The object target is illuminated and the lens is mounted, e.g., an equal number of focal lengths from the target to focus an image at an image plane. An opaque plate member having an elongate narrow slit parallel to the light lines is mounted at the image plane for lateral movement of the slit at a uniform speed across the image plane. The differences in illumination at the slit, particularly as the slit travels from dark to light and light to dark areas of the image, is detected by a photoelectric converter which outputs an electrical signal defining the modulation properties of the lens. The signal can be amplified and read in an oscilloscope for visual examination or compared with standard signals in a computer.

While such systems may have achieved certain degrees of success in their particular applications, there is a need to for a focus determining system in a computed radiography reader or other laser scanning system, which is cost efficient, which utilizes existing system components where appropriate, and which is relatively simple to use.

SUMMARY OF THE INVENTION

According to one aspect of the present invention, there is provided a non-imaging tool for assisting in determining the best focus in a scanning system that scans a planar object with a scanning beam in a fast scan direction, while the planar object is moved under the scanning beam in a slow scan direction perpendicular to the fast scan direction. The tool includes a plate having a planar surface; a focusing wedge mounted on the plate; and a ramped grating which forms part of the focusing wedge and which has a tilted surface which extends from above the plate surface to below the plate surface; the ramped grating including alternating parallel first stripes and second stripes, wherein said first and second stripes are one of, respectively, fluorescent and non-fluorescent stripes, storage phosphor and non-storage phosphor stripes, and reflective and non-reflective stripes.

The present invention has some advantages. An optimal focus of the scanning system of a CR reader is determined in a simple and low cost manner. This is desirable during assembly and field repairs or upgrades of the reader. The components of the CR reader can be utilized to determine best focus.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
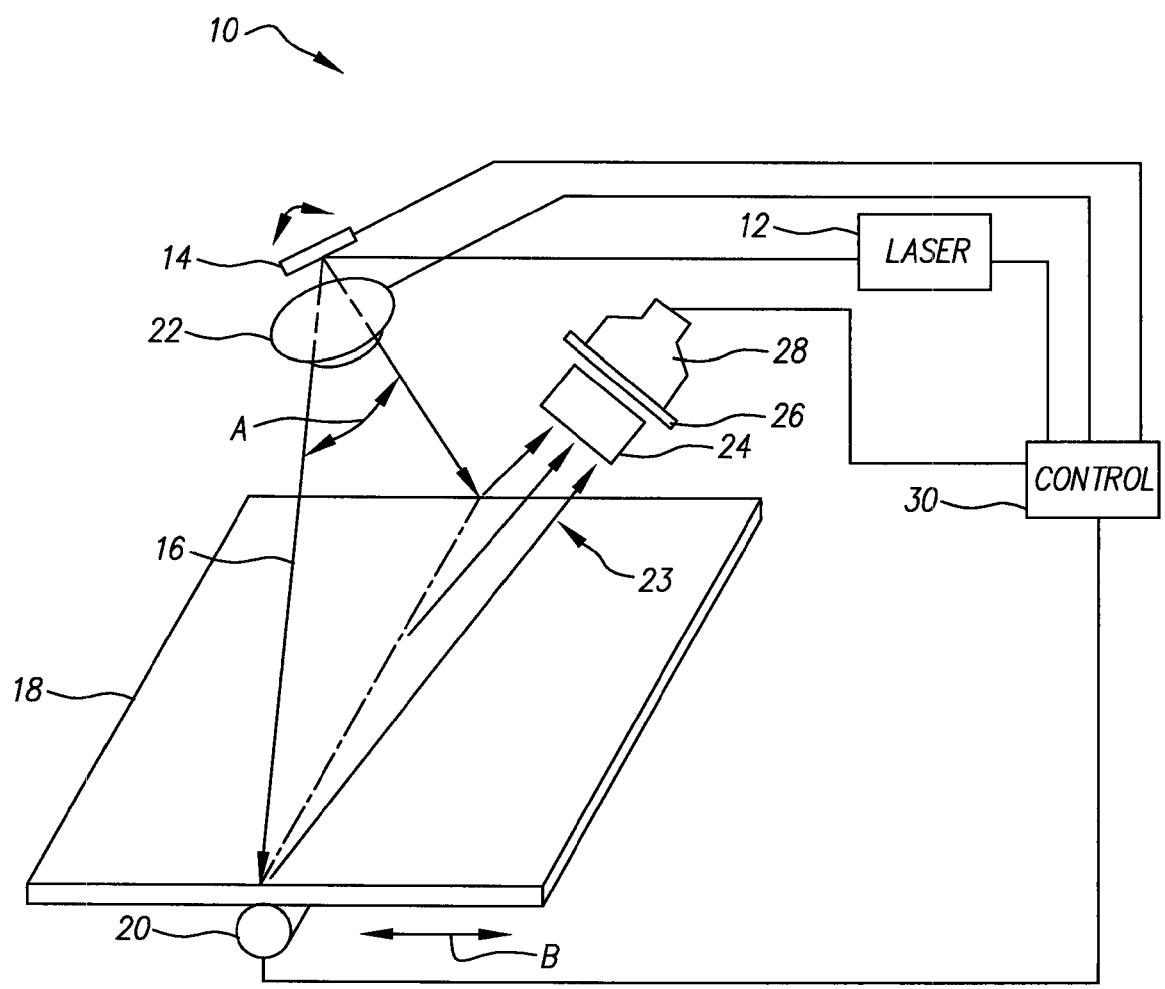
FIG. 1 is a diagrammatic, perspective view showing a computed radiography reader with which the present invention can be used.

The following is a detailed description of the preferred embodiments of the invention, reference being made to the drawings in which the same reference numerals identify the same elements of structure in each of the several figures.

In general, according to the present invention, there is provided a non-imaging tool cassette that has appropriately located MTF grating targets. The grating is preferably detected by a fluorescent grating that alternates fluorescing stripes with non-fluorescing stripes. The fluorescent material is chosen to have good excitation at the scanning laser wavelength and to have an output wavelength that leaks through the photodetector filter yet is in the sensitivity range of the photodetectors. With a blue filter, a material fluorescing in the far red and near infrared wavelengths works well.

Each target includes ramped gratings that shift the focus position of the grating surface relative to the best focus position of the scanning beam during a scan. This permits determining where the best focus position of the beam is before making any focus adjustment on the scanner. The grating can be oriented for detection in either the slow-scan or fast-scan direction. The non-imaging tool cassette may also contain gratings near and parallel to where the phosphor plane would lie in an imaging cassette to determine if the focus plane of the phosphor would stay constant as the plate translates. To have good optical detection of the focus shift, the stripes in the grating should be close to the size of the spot diameter.

Referring now to FIG. 1, there is shown a computed radiography (CR) reader with which the present invention can be used. As shown, CR reader 10 includes a laser 12 which produces a laser beam of a first wavelength, and an oscillating mirror 14 which scans the laser beam 16 across exposed storage phosphor plate 18 in a fast scan (line scan) direction A while plate 18 is translated in a slow scan (page scan) direction B by translation mechanism 20 to effect a raster scan of plate 18. Laser beam 16 is focused on plate 18 by focusing optics 22 which are adjustable. Laser beam 16 produces emitted radiation of a second wavelength range as a function of the intensity of the stored image in plate 18. The emitted radiation is collected by radiation collector 24 and transmitted through filter 26 to photodetector assembly 28. Photodetector assembly 28 produces an image signal which is digitized and stored in memory, displayed on an electronic monitor, or printed out on hard copy media (not shown). Control 30 controls laser 12, photodetector assembly 28, focusing optics 22 and translation mechanism 20. Control 30 includes standard computer components such as microprocessor, magnetic and optical disk or tape drives, software applications and computer operating system, an electronic display, and input and output devices to communicate with components of reader 10. Such microcomputer systems are well known in the art and will not be described in detail.

Exemplary CR readers are disclosed in U.S. Pat. No. 5,311,032, issues May 10, 1994, inventors Montoro et al., and U.S. Pat. No. 6,437,353 B1, issued Aug. 20, 2002, inventors Hall et al., which are incorporated herein by reference.

Figure 2:
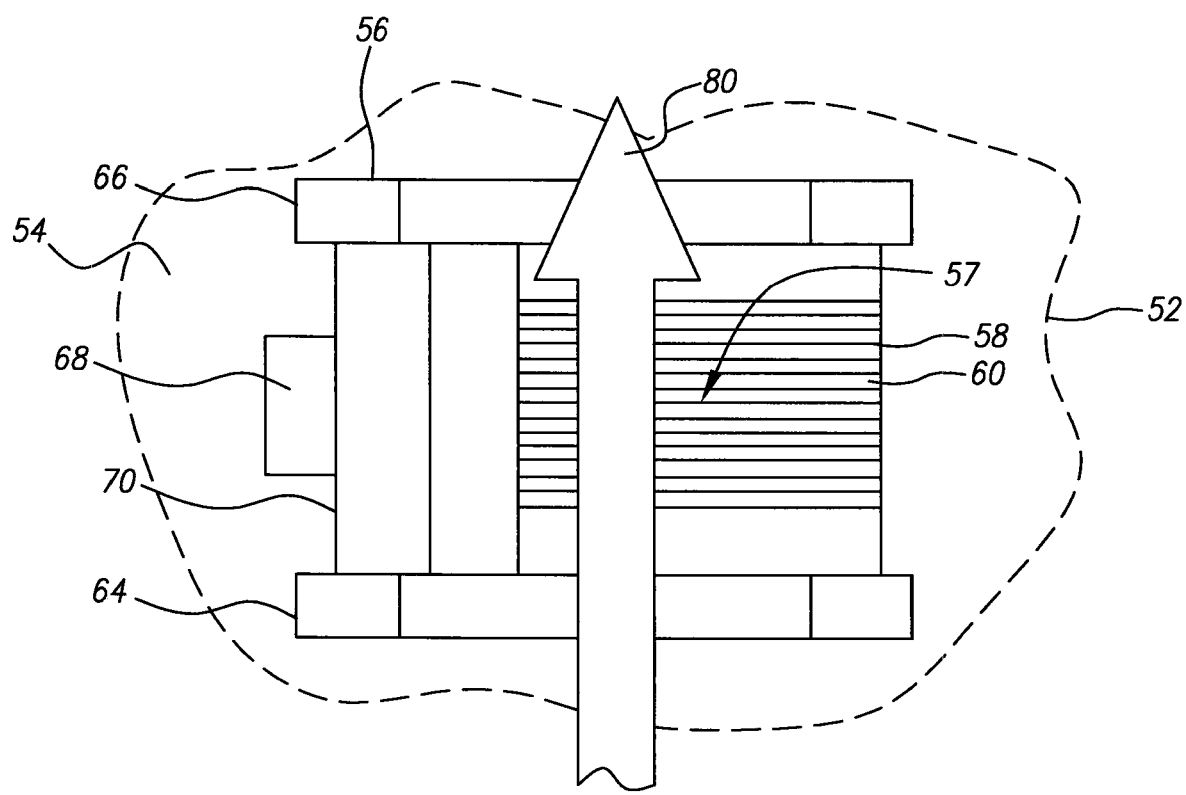
FIG. 2 is a diagrammatic plan view showing an embodiment of the present invention.
Figure 3:
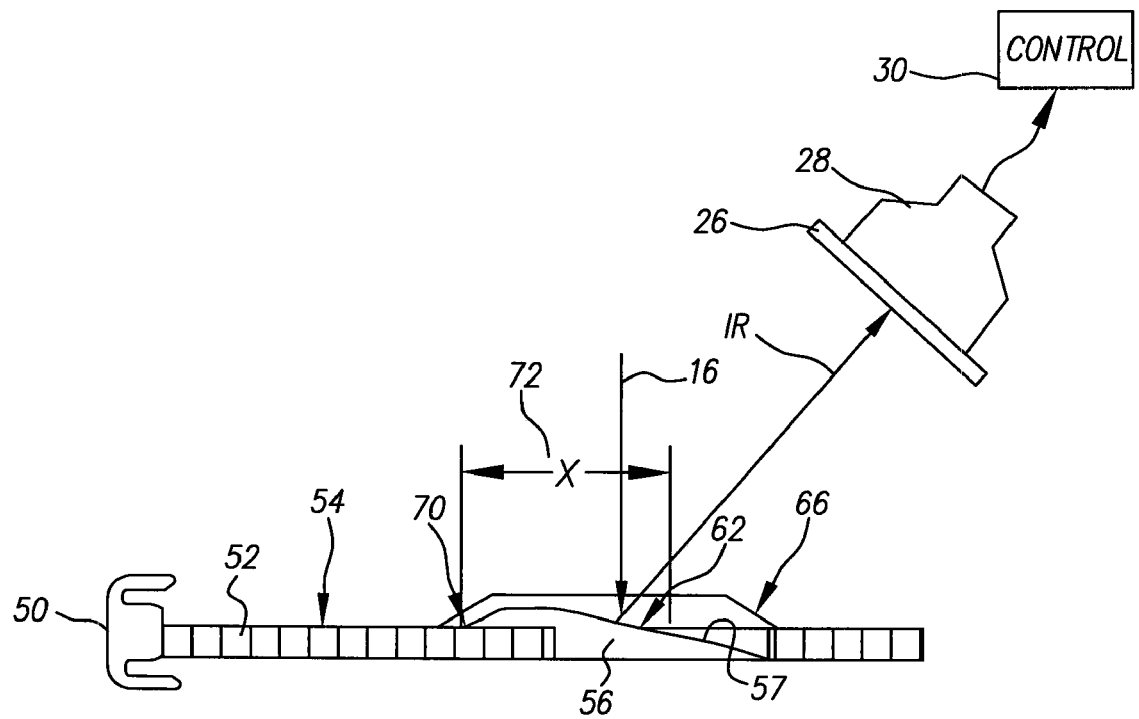
FIGS. 3 and 4 are diagrammatic, elevational views showing the embodiment of FIG. 2.
Figure 4:
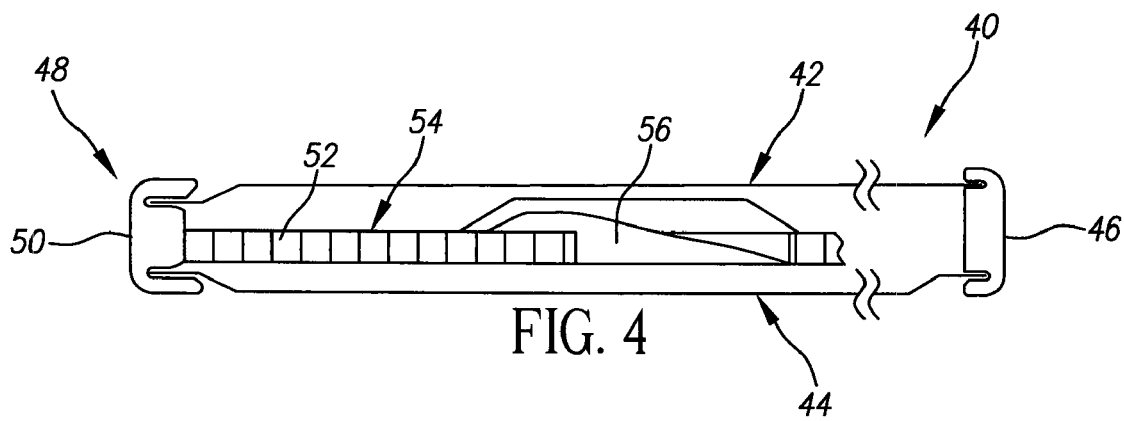

Referring now to FIGS. 2, 3, and 4, there will be described an embodiment of the present invention. As shown, non-imaging tool cassette 40 includes upper and lower members 42 and 44, front member 46, and side members (not shown). Members 42, 44, 46, and the not shown side members form a five-sided shell which contains removable plate assembly 48. Plate assembly 48 includes front member 50 which closes off cassette 40 and member or plate 52 which is cantilevered from member 50. Cassette 40 is of the same dimensions and general construction as storage phosphor cassettes which are used with CR reader 10 (FIG. 1). an exemplary cassette is disclosed in U.S. Pat. No. 5,861,631, issued Jan. 19, 1999, inventors Wendlandt et al., which is incorporated herein by reference. Exemplary mechanisms for removing and replacing a plate from and to a cassette are disclosed in the above-referenced U.S. Pat. Nos. 5,311,032 and 6,437,353. According to the invention, plate 52 contains the plate surface 54, to which a storage phosphor is applied in an imaging cassette, and a focusing wedge 56, which includes ramped grating 57 with alternating fluorescent stripes 58 and non-fluorescent stripes 60. Stripes 58 and 60 run perpendicularly to the fast scan direction 80. Wedge 56 places grating 57 in a tilted plane that crosses the plane of plate surface 54 at location 62. Wedge 56 includes grating shields 64 and 66, and fluorescent patch 68 bordered by fiducial edge 70. Fiducial edge 70 locates the ramp/plate crossing position at a known distance 'x' (arrow 72) which extends between fiducial edge 70 and ramp/plate crossing location 62.

Also shown in FIG. 3 are laser beam 16, photodetector 28 and filter 26 which are shown in FIG. 1. Stripes 58 and 60 are perpendicular to the fast scan direction 80 of laser beam 16.

Photodetector 28 must read a weak emitted radiation (e. g., infrared) signal from a fluorescent grating. Laser beam mirror sweep rate should be reduced to pass more spatial frequency through the Nyquist filter to be digitized by control 30. The slot size on the grating should be slightly larger than the spot size.

If scanned in the fast-scan (line-scan) direction with a grating as shown in FIGS. 2-4, the filtering effects of the Nyquist filter and aliasing problems must be considered. Since the pixel size is usually close to the laser spot size, the best grating size to use for focus detection will encounter some aliasing issues. The grating cycle pitch should be larger than 2× the pixel pitch to ensure seeing the grating if digitized directly. Ideally, the fast-scan mirror scan speed would be slowed for a fast-scan grating and the sampling rate kept constant in time frequency to increase the fast-scan resolution to better resolve the grating and avoid the aliasing and Nyquist issue. This reduces the fast-scan pixel size even though the beam spot size stays the same. As the speed is slowed, mirror drive cogging issues must be considered, but since the reading of the non-imaging fluorescent target is a non-destructive scan, more velocity fluctuation can be tolerated at the slowed scan velocity than would be the case if a charged phosphor target grating were used.

One requirement for determining the focus adjustment is to know the position on the ramp at which data is gathered. The geometry of the ramp block can accurately define this but its position as assembled to the plate is less accurately known and variability in start of page scan can cause further error. To eliminate this problem, fluorescent patch 68 located under a block edge defines a fiducial edge 70 on the ramp block in the page scan direction. This eliminates the need for accurately locating the grating on the wedge surface or the wedge block on the plate surface.

Figure 5A:
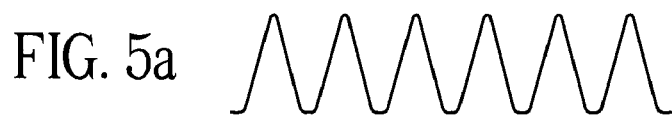
FIGS. 5(a), 5(b), and 5(c) are graphical views useful in illustrating the operation of the embodiment of the present invention shown in FIG. 2.
Figure 5B:
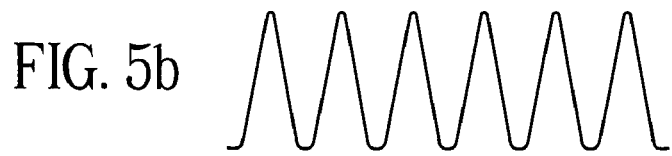
Figure 5C:

FIGS. 5(a)-5(c) graphically illustrate possible results as the laser spot scans across different levels of the ramp to find best focus at maximum amplitude. FIG. 5(b) shows the best focus on the ramp at maximum amplitude. This data can be used by control 30 to adjust the focus of the laser beam by adjusting focusing optics 22 (FIG. 1).

Figure 6:
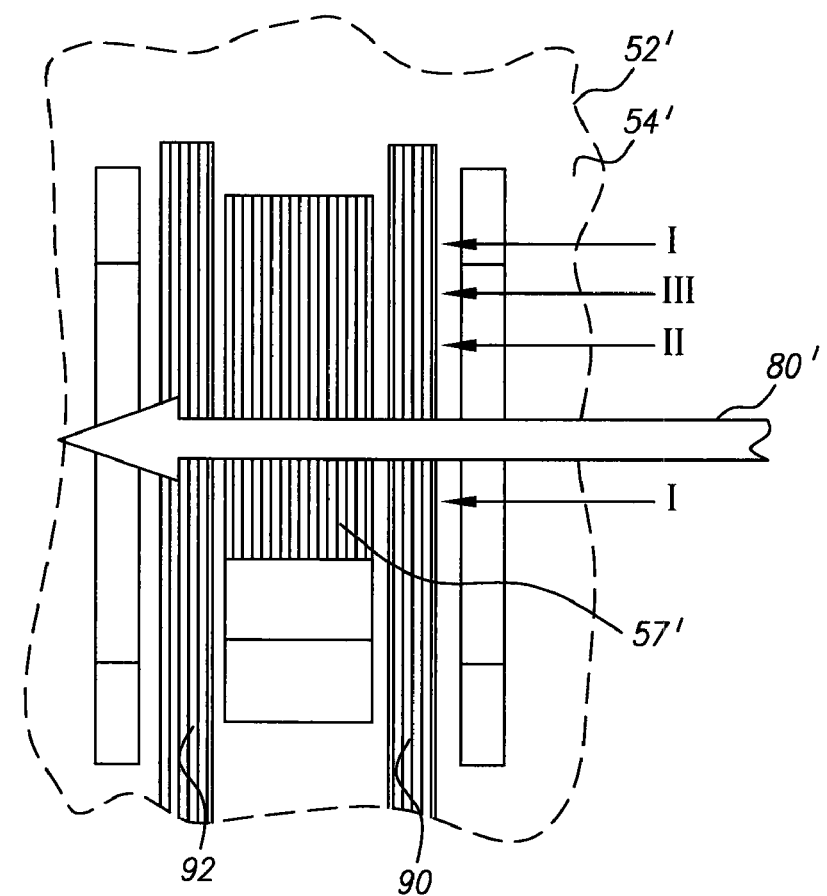
FIG. 6 is a diagrammatic, plan view showing another embodiment of the present invention.
Figure 7A:
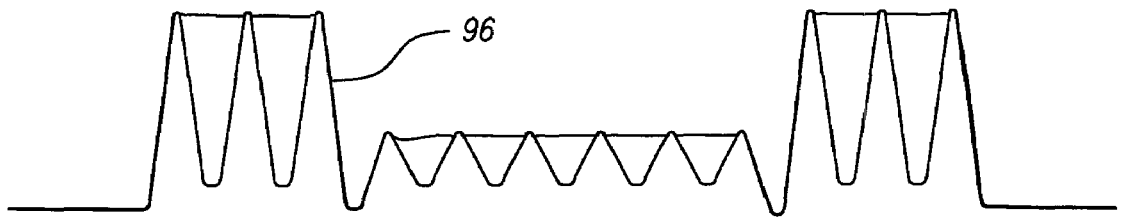
FIGS. 7(a), 7(b), and 7(c) are graphical views useful in illustrating the operation of the embodiment shown in FIG. 6.
Figure 7B:
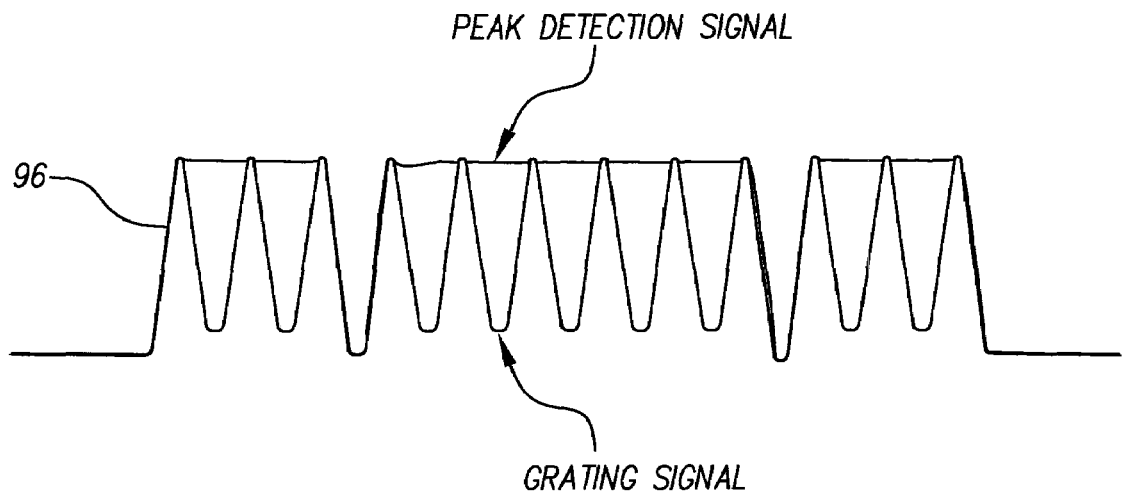
Figure 7C:
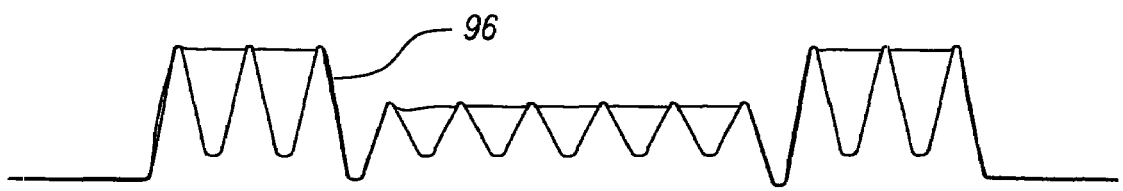

Referring now to FIG. 6, there is shown another embodiment of the present invention. As shown, two plate surface gratings 90 and 92 are provided parallel to ramp grating 57' on plate 52' having surface 54'. As will be explained later, gratings 90, 92 are useful for determining plate focus shift along the length of the slow-scan motion. The fast-scan grating of FIG. 6 can be used with a peak detection circuit in control 30. This phenomenon is illustrated in FIGS. 7(a)-7(c) by the dark line 96 that envelops the peaks of the high frequency analog signal from the photodetector assembly 28 (FIG. 1) that monitors light modulated by the MTF grating(s). In general, the taller the envelope, the better the focus will be. For the focusing operation, the peak detection circuit would receive the photodetected high frequency analog signal and output an analog envelope signal to the Nyquist filter and digitizing system also in control 30. Since the envelope of the high frequency curve varies at a much lower rate than the high frequency signal, it can be accurately digitized without encountering aliasing and Nyquist filter issues. The mirror drive does not need to be slowed to reduce aliasing since there is virtually none. The peak detection circuit would only be switched in for the focusing operation.

As shown in FIG. 7(a), the plate is at best focus and the scan is not at the wedge/plate crossing at locations I in FIG. 6. As shown in FIG. 7(b), the plate is at the best focus and the scan is at the wedge/plate crossing location II. As shown in FIG. 7(c), the plate is out of focus and the scan is not at the wedge/plate crossing at location III.

Figure 8:
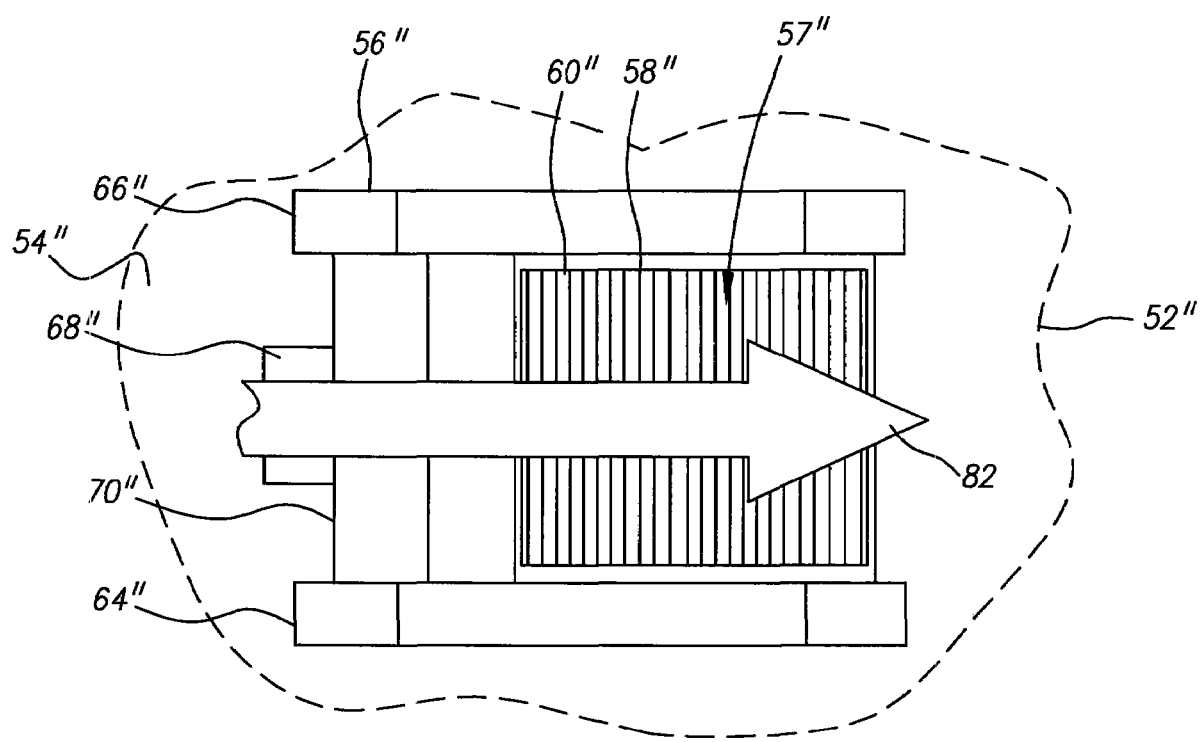
FIG. 8 is a diagrammatic, plan view showing another embodiment of the present invention.
Figure 9:
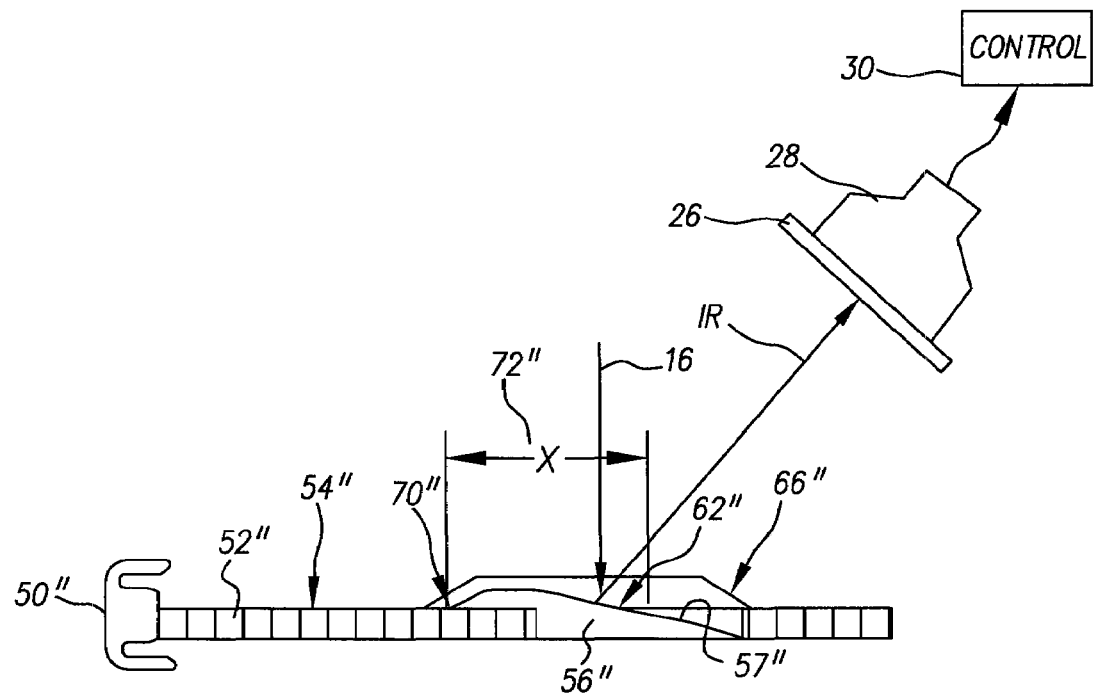
FIGS. 9 and 10 are diagrammatic elevational views showing the embodiment of FIG. 8.
Figure 10:
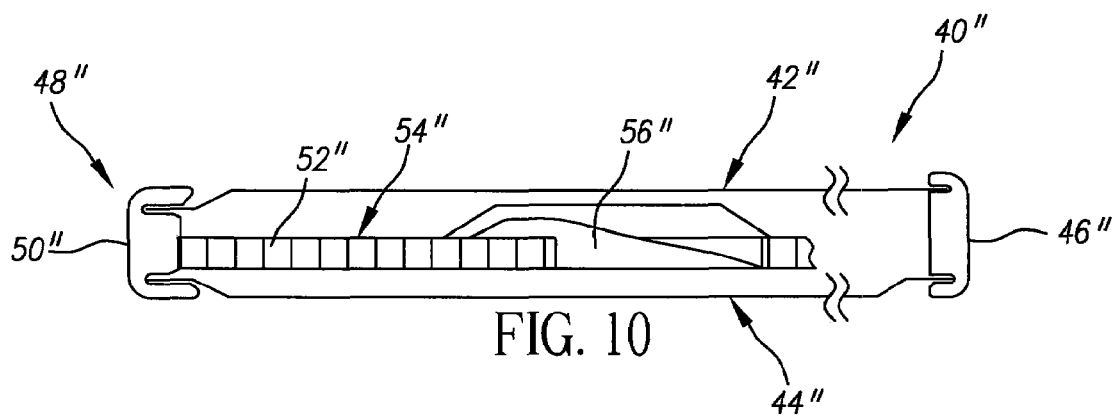

Referring now to FIGS. 8, 9, and 10, there is shown another embodiment of the present invention in which the gratings are oriented to detect slow-scan MTF signals. As shown, non-imaging tool cassette 40" includes upper and lower members 42" and 44", front member 46", and side members (not shown). Members 42", 44", 46", and the not shown side members form a five-sided shell which contains removable plate assembly 48". Plate assembly 48" includes front member 50" which closes off cassette 40" and member or plate 52" which is cantilevered from member 50". Cassette 40" is of the same dimensions and general construction as storage phosphor cassettes which are used with CR reader 10 (FIG. 1). According to the invention, plate 52" contains the plate surface 54", to which a storage phosphor is applied in an imaging cassette, and a focusing wedge 56", which includes ramped grating 57" with alternating fluorescent stripes 58" and non-fluorescent stripes 60". Stripes 58" and 60" run perpendicularly to the slow scan direction 82. Wedge 56" places grating 57" in a tilted plane that crosses the plane of plate surface 54" at location 62". Wedge 56" includes grating shields 64" and 66", and fluorescent patch 68" bordered by fiducial edge 70". Fiducial edge 70" locates the ramp/plate crossing position at a known distance 'x' (arrow 72") which extends between fiducial edge 70" and ramp/plate crossing location 62".

While there is no Nyquist filter issue in the slow-scan direction, the aliasing problem is still there. Reducing the slow-scan speed to increase the slow-scan pixel resolution can reduce this problem. As in the fast-scan case, the position of the ramped grating 57" can be very accurately determined by a fiducial edge 70". In the slow-scan case, the accuracy of detection of the fiducial edge improves if the slow-scan speed is reduced to reduce the slow-scan pixel dimension.

In both the slow-scan and fast-scan embodiments, widening the ramped grating and digitally averaging the value of the trace across the ramp can reduce the grating signal noise. In the slow-scan case, first digitally define a slow-scan peak envelope, and then average the value of the peak envelopes 104 and 106 across the wedge. This reduces noise without canceling out signal if the grating is slightly skewed to the fast-scan direction.

Figure 11A:
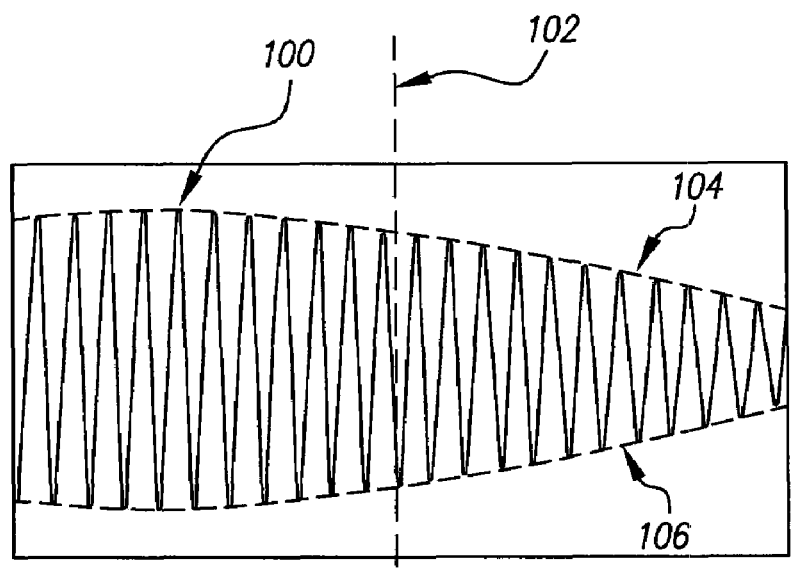
FIGS. 11(a), 11(b), and 11(c) are graphical views useful in illustrating the operation of the embodiment of FIG. 8.
Figure 11B:
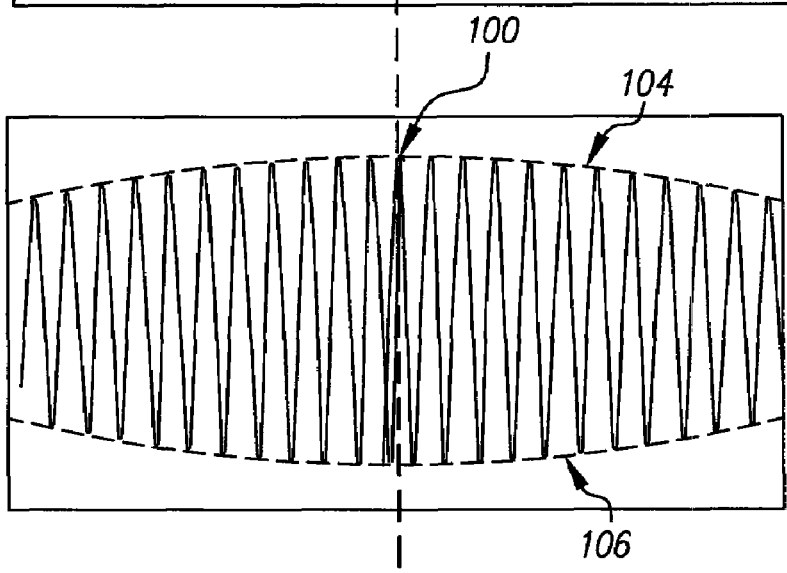
Figure 11C:
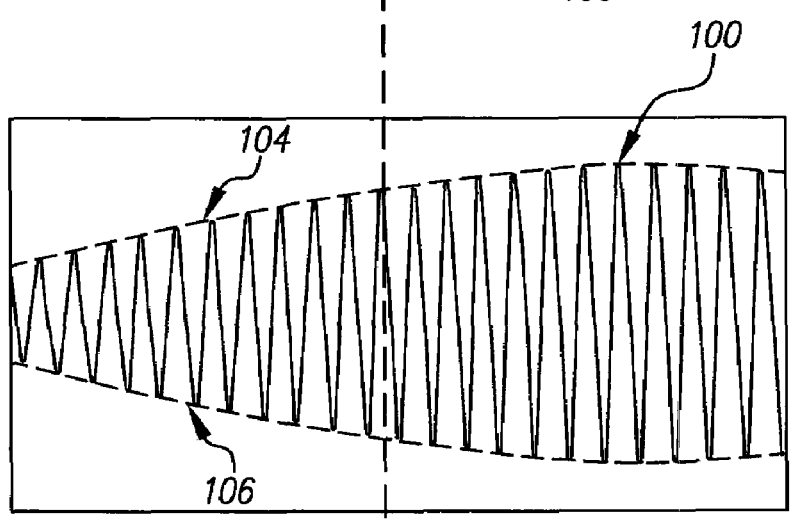

FIGS. 11(a), 11(b), and 11(c) graphically show possible grating results from this embodiment of the invention. FIG. 11(b) shows the in focus case. The best focus is shown by arrows 100. Line 102 shows the grating/plate surface crossing location. Note that the positions of best focus can be determined by looking for:

The position of maximum amplitude of the grating signal (104-106).

The position of the maximum of the upper signal envelope (104).

The position of the minimum of the lower signal envelope (106).

Which approach to use depends on the nature of the noise that may be seen on the signal. for example, in a system where the peaks of the sinusoidal grating signal show a lot of noise, it may be advantageous to detect the position of the minimum of the lower signal envelope. For a low noise system, using the amplitude, 104 minus 106, is best since it shows the most change with position.

As was shown in FIG. 6, grating stripes in a non-imaging tool cassette can be positioned along the length of the plate parallel and near the plane that the storage phosphor occupies in an imaging cassette. This allows a determination of whether the plate moves in and out relative to the best focus position as the plate is scanned. This information can have two useful applications:

(1) If the variability in the focus direction is within acceptable limits as the plate moves through slow-scan, that focus position variability data can be factored into the information determined from the wedge focus data to select a focus setting that gives the best overall focus for the plates in that machine.

(2) If the variability in the focus direction is excessive, it can inform the installer that there may be a plate positioning mechanism problem to correct before proceeding with focusing.

Figure 12A:
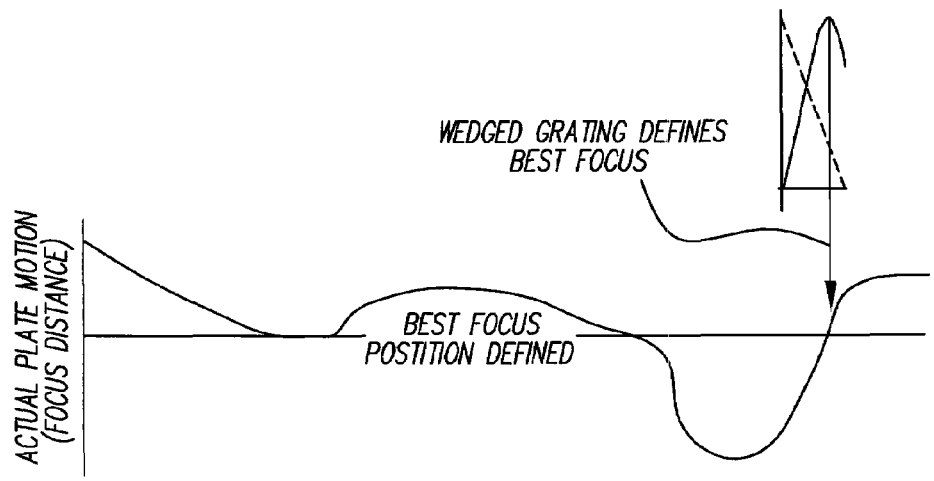
FIGS. 12(a), 12(b), 12(c), and 12(d) are graphical views useful in illustrating another aspect of the present invention.
Figure 12B:
Figure 12C:
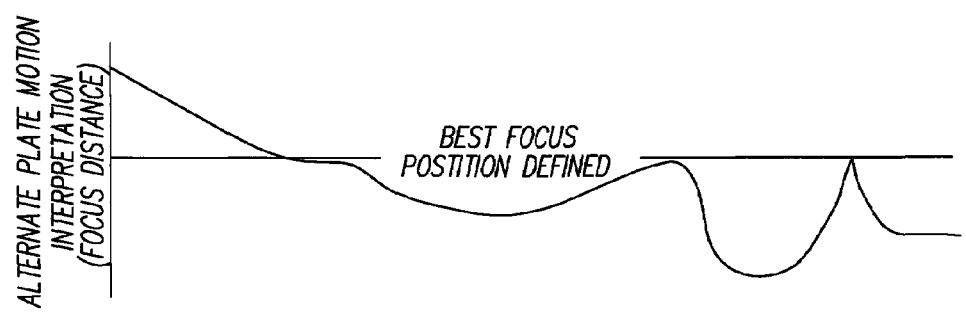
Figure 12D:
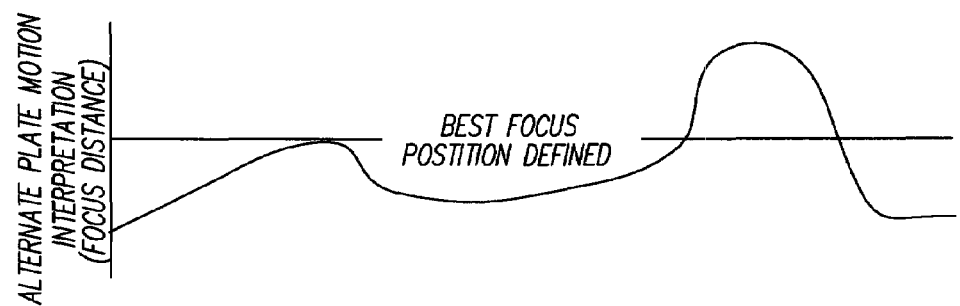

Illustrated in FIGS. 12(a)-12(d) is the case where the plate surface grating stripe and the wedge data show the plate reaching best focus at various positions during slow-scan motion. FIG. 12(a) shows actual plate motion (focus distance), FIG. 12(b) shows MTF from phosphor plane grating, FIGS. 12(c) and 12(d) show alternate plate motion interpretations (focus distance). In FIGS. 12(a), 12(c), and 12(d), the dotted horizontal line represents the best focus position defined. In FIG. 12(b) the dotted horizontal line shows that the maximum MTF is at the best focus position.

In the case of one scan of a plate surface stripe, MTF data is ambiguous on whether the plate surface passes through best focus or reaches that position and reverses direction. It is also unclear on which side of best focus it is. If the focus is adjusted and a second scan is done, then the orientation of all parts of the curve is known. This would also be the case if two stripes are used (as shown in FIG. 6) and the stripes are shimmed to constant but different distances above the plate surface.

It will be understood by those skilled in the art that while the plate surface grating was illustrated in the fast-scan-with-peak-detection in FIG. 6, it can be used equally well in all methods described. It will also be understood that a single plate can have both fast-scan and slow-scan focusing wedges. Although the present invention has been described in relation to a CR reader having a laser scanning system, it will be understood that the present invention can be used in other scanning systems well known to those skilled in the art.

It will also be understood that while in the embodiments described the focusing wedge 56, 56' orientation shifted the focus position as a function of slow-scan motion, the invention worked equally well if the focusing edge and fiducial edge are rotated 90 degrees about the plate normal so as to shift focus as a function of the fast-scan spot motion. The wedge focusing system can also be designed to function with these features at any intermediate angle between these two orientations. this is also true of the grating stripe orientation that has been described in either fast-scan of slow-scan orientation but can also be implemented at any intermediate angle.

Figure 13:
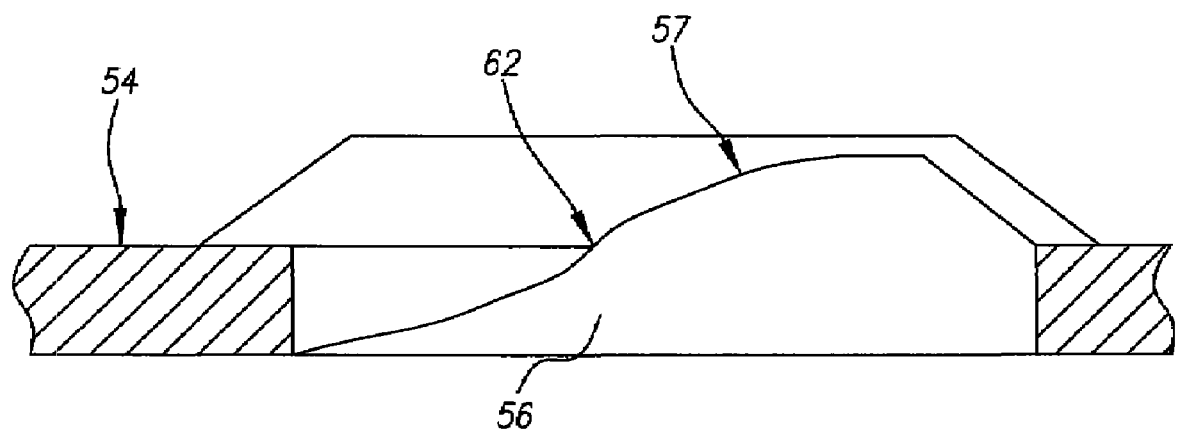
FIG. 13 is a diagrammatic view showing another embodiment of the present invention.

It will also be understood that, while a planar wedge has been shown and described, the invention will also work with a non-planar wedge as shown in FIG. 13, where the ramped grating 57 is on a wedge 56 which has a varying wedge angle along its length.

It will also be understood that while the invention has been described with alternating fluorescent and non-fluorescent stripes in the grating, the concept could also be implemented with storage phosphor stripes in the grating, in place of the fluorescent stripes. In that case, the storage phosphor stripes would emit blue light when stimulated with a red laser spot during the focusing scan, but the focusing tool cassette would have to be charged with an x-ray exposure before the focusing scan.

It will also be understood that a grating that simply alternates reflective and non-reflective stripes to modulate the red laser light reflection could also be used if either:

1. The blue filter 26 is removed to permit the photodetector to sense red light directly or an alternate red sensitive detector is used to sense reflected red for focusing.

2. The reflected, collected red light signal is converted to a blue-filter penetrating wavelength prior to reaching the blue filter. This could be accomplished by inserting a fluorescing filter or fluorescing reflective surface in front of the blue filter to convert the reflected modulated red light to fluorescent wavelengths that pass the filter.

Although reference has been made to specific light colors, it will be understood that other light colors can be used depending on the type of the scanning laser and the types of the fluorescent, storage phosphor, or reflective material used.

The invention has been described in detail with particular reference to a presently preferred embodiment and some alternative embodiment described, but it will be understood that additional variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 CR reader
12 laser
14 oscillating mirror
16 laser beam
18 exposed storage phosphor plate
20 translation mechanism
22 focusing optics
24 radiation collector
26 filter
28 photodetector assembly
30 control
40, 40" non-imaging tool cassette
42, 42" upper member
44, 44" lower member
46, 46" front member
48, 48" removable plate assembly
50, 50" front member
52, 52', 52" plate
54, 54', 54" plate surface
56, 56" focusing wedge
57, 57', 57" ramped grating
58, 58" fluorescent stripes.
60, 60" non-fluorescent stripes
62, 62" ramp/plate crossing location
64, 64", 66, 66" grating shields
70, 70" fiducial edge
72, 72" known distance "x"
80 fast scan direction
82 slow scan direction
90, 92 plate surface gratings
96 peak detection signal
100 best focus
102 ramp/plate crossing
104 signal upper envelope
106 signal lower envelope

What is claimed is:

1. A non-imaging tool for assisting in determining a focus in a scanning system that scans a planar object with a scanning beam in a fast scan direction, while the planar object is moved under the scanning beam in a slow scan direction perpendicular to the fast scan direction, the tool comprising:
   a plate having a planar surface;
   a focusing wedge mounted on the plate; and
   a ramped grating which forms part of the focusing wedge and which has a tilted surface which extends from above the plate surface to below the plate surface; the ramped grating including alternating, parallel first stripes and second stripes, wherein the first and second stripes are one of, respectively, fluorescent and non-fluorescent stripes, storage phosphor and non-storage phosphor stripes, and reflective and non-reflective stripes.

2. The tool of claim 1 wherein the tool is removably contained in a cassette.

3. The tool of claim 1 wherein the focusing wedge has grating shields on either side of the ramped grating.

4. The tool of claim 1 wherein the tilted plane of the ramped grating crosses the plane of the plate surface at a ramp/plate crossing location and wherein the focusing wedge has a fiducial edge which is spaced from the crossing location a known distance and which locates the crossing location.

5. The tool of claim 4 including one of a fluorescent, storage phosphor and reflective patch bordering the fiducial edge.

6. The tool of claim 1 wherein the ramped grating stripes run perpendicularly to the fast-scan direction of a scanning beam.

7. The tool of claim 1 wherein the ramped grating stripes run perpendicularly to the slow-scan direction of a scanning beam.

8. The tool of claim 1 including at least one plate surface grating having parallel alternating first stripes and second stripes, wherein the first and second stripes are one of, respectively, fluorescent and non-fluorescent stripes, storage phosphor and non-storage phosphor stripes, and reflective and non-reflective stripes which are positioned parallel to the ramp grating and which are near to and parallel to the plate surface.

9. A method of determining a focus in a scanning system comprising:
   providing a plate having a planar surface and having a focusing wedge with a ramped grating which has a tilted plane which extends from above the plate surface to below the plate surface, the ramped grating including alternating parallel first stripes and second stripes, wherein the first and second stripes are one of, respectively, fluorescent and non-fluorescent stripes, storage phosphor and non-storage phosphor stripes, and reflective and non-reflective stripes;
   scanning the ramped grating in a raster pattern with a beam of radiation to cause the first stripes to emit or reflect radiation;
   detecting the emitted or reflected radiation to produce a signal representative of the focus condition of the scanning beam of radiation; and
   determining from the signal the best focus for the scanning beam of radiation.

10. The method of claim 9 wherein the plate is moved in a slow-scan direction as the scanning beam is scanned across the plate in a fast-scan direction; and wherein the ramped grating stripes run perpendicularly to the fast scan direction.

11. The method of claim 9 wherein the plate is moved in a slow-scan direction as the scanning beam is scanned across the plate in a fast-scan direction, and wherein the ramped grating stripes run perpendicularly to the slow-scan direction.

12. The method of claim 9 wherein the tilted plane of the ramped grating crosses the plane of the plate surface at a ramp/plate crossing location and wherein the focusing wedge has a fiducial edge which borders a patch which is one of a fluorescent, storage phosphor, and reflective material, and, which is spaced from the crossing location a known distance, and which locates the crossing location.

13. The method of claim 9 wherein the plate includes at least one plate surface grating having parallel alternating first stripes and second stripes, wherein the first and second stripes are one of, respectively, fluorescent and non-fluorescent stripes, storage phosphor and non-storage phosphor stripes, and reflective and non-reflective stripes, which are positioned parallel to the ramp grating, which are near to and parallel to the plate surface; and, which, when scanned by the scanning beam of radiation, produces a signal which is representative of plate focus shift along the length of the slow-scan motion of the raster scan.

14. The method of claim 9 wherein in the determining, the best focus position of the scanning beam of radiation is determined by the location(s) at which the signal is at a maximum.

15. The method of claim 14 wherein the signal maximum is determined by a peak detection circuit.

* * * * *